US007368712B2

(12) United States Patent
Boye et al.

(10) Patent No.: US 7,368,712 B2
(45) Date of Patent: May 6, 2008

(54) Y-SHAPED CARBON NANOTUBES AS AFM PROBE FOR ANALYZING SUBSTRATES WITH ANGLED TOPOGRAPHY

(75) Inventors: Carol A. Boye, Latham, NY (US); Toshiharu Furukawa, Essex Junction, VT (US); Mark C. Hakey, Fairfax, VT (US); Steven J. Holmes, Gilderland, NY (US); David V. Horak, Essex Junction, VT (US); Charles W. Koburger, III, Delmar, NY (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 11/164,792

(22) Filed: Dec. 6, 2005

(65) Prior Publication Data

US 2007/0125946 A1    Jun. 7, 2007

(51) Int. Cl.
*G01N 23/00* (2006.01)
*G21K 7/00* (2006.01)

(52) U.S. Cl. .................. 250/306; 250/307; 73/105; 204/157.47; 423/447.2; 438/14

(58) Field of Classification Search .................. 73/105; 250/306, 307; 204/157.47; 423/447.2; 438/14
See application file for complete search history.

(56) References Cited

U.S. PATENT DOCUMENTS

| 5,824,470 | A | 10/1998 | Baldeschwieler et al. |
| 6,159,742 | A * | 12/2000 | Lieber et al. ............... 436/164 |
| 6,645,455 | B2 * | 11/2003 | Margrave et al. ......... 423/447.1 |
| 6,755,956 | B2 | 6/2004 | Lee et al. |
| 6,780,664 | B1 | 8/2004 | Goruganthu et al. |
| 6,800,865 | B2 | 10/2004 | Nakayama et al. |
| 6,841,139 | B2 | 1/2005 | Margrave et al. |
| 6,871,528 | B2 * | 3/2005 | Schlaf et al. ................. 73/105 |
| 2004/0009308 | A1 | 1/2004 | Schlaf et al. |
| 2004/0038430 | A1 | 2/2004 | Vandermeeren et al. |

OTHER PUBLICATIONS

Li, et al., "Straight Carbon Nanotube Y Junctions," Applied Physics Letters, vol. 79, No. 12, Sep. 17, 2001, pp. 1879-1881.
Dai, L. et al., "Functionalized surfaces based on polymers and carbon nanotubes for some biomedical and optoelectronic applications," Nanotechnology 14 No. 10, pp. 1081-1097, Oct. 2003.

* cited by examiner

*Primary Examiner*—Jack I. Berman
*Assistant Examiner*—Meenakshi S Sahu
(74) *Attorney, Agent, or Firm*—Gibb & Rahman, LLC; Lisa U. Jaklitsch, Esq.

(57) ABSTRACT

A Y-shaped carbon nanotube atomic force microscope probe tip and methods comprise a shaft portion; a pair of angled arms extending from a same end of the shaft portion, wherein the shaft portion and the pair of angled arms comprise a chemically modified carbon nanotube, and wherein the chemically modified carbon nanotube is modified with any of an amine, carboxyl, fluorine, and metallic component. Preferably, each of the pair of angled arms comprises a length of at least 200 nm and a diameter between 10 and 200 nm. Moreover, the chemically modified carbon nanotube is preferably adapted to allow differentiation between substrate materials to be probed. Additionally, the chemically modified carbon nanotube is preferably adapted to allow fluorine gas to flow through the chemically modified carbon nanotube onto a substrate to be characterized. Furthermore, the chemically modified carbon nanotube is preferably adapted to chemically react with a substrate surface to be characterized.

20 Claims, 11 Drawing Sheets

Y-SHAPED CARBON NANOTUBES AS AFM PROBE FOR ANALYZING SUBSTRATES WITH ANGLED TOPOGRAPHY

BACKGROUND

1. Field of the Invention

The embodiments herein generally relate to atomic force microscopy (AFM), and, more particularly, to methods of forming AFM probes for analyzing substrates.

2. Description of the Related Art

Atomic Force Microscopy (AFM) is often used as a method of characterizing critical dimensions of width, height, profile, and surface chemistry for structures on a semiconductor substrate. In order to characterize the topography of trench features of silicon devices, it is desirable to fabricate AFM probe tips that have an angled feature near the active end of the probe tip. Conventionally, these probe tips are fabricated by etching silicon features with an angled structure or foot at one end of the silicon feature.

FIG. 1 illustrates a conventional AFM probe apparatus. Generally, the AFM probe 1 comprises a probe arm 2 terminating with a tip 3. The probe tip 3 is then used to analyze the profile of the surface 5 of a substrate 4. A particular feature 6 on the surface 5 of the substrate 4 may have an undercut feature defined by inwardly sloping sidewalls 7. The topography of this feature 6 generally makes it difficult for the probe tip 3 to fully analyze all of the surface features of the substrate 4.

Therefore, it remains desirable to develop additional methods of manufacturing AFM probe tips more reproducibly, and from other materials than silicon, which can be more durable and have a smaller dimension than conventional AFM probe tips, which can be used to analyze substrates with an angled topography, and which can be used for exploring the chemistry of the surfaces of substrate topography.

SUMMARY

In view of the foregoing, an embodiment herein provides a Y-shaped carbon nanotube atomic force microscope probe tip comprising a shaft portion; a pair of angled arms extending from a same end of the shaft portion, wherein the shaft portion and the pair of angled arms comprise a chemically modified carbon nanotube, and wherein the chemically modified carbon nanotube is modified with any of an amine, carboxyl, fluorine, and metallic component. Preferably, each of the pair of angled arms comprises a length of at least 200 nm and a diameter between 10 and 200 nm. Moreover, the chemically modified carbon nanotube is preferably adapted to allow differentiation between substrate materials to be probed. Additionally, the chemically modified carbon nanotube is preferably adapted to allow fluorine gas to flow through the chemically modified carbon nanotube onto a substrate to be characterized. Furthermore, the chemically modified carbon nanotube is preferably adapted to chemically react with a substrate surface to be characterized.

Another embodiment provides a method of forming a Y-shaped carbon nanotube atomic force microscope probe tip, wherein the method comprises forming a shaft portion of the probe tip; extending a pair of angled arms from a same end of the shaft portion, wherein the shaft portion and the pair of angled arms comprise a carbon nanotube; and chemically modifying the carbon nanotube with any of an amine, carboxyl, fluorine, and metallic component. The method may further comprise configuring each of the pair of angled arms at a length of at least 200 nm; and configuring each of the pair of angled arms at a diameter between 10 and 200 nm. Moreover, the chemically modified carbon nanotube is preferably adapted to allow differentiation between substrate materials to be probed. Furthermore, the chemically modified carbon nanotube is preferably adapted to allow fluorine gas to flow through the chemically modified carbon nanotube onto a substrate to be characterized. Additionally, the chemically modified carbon nanotube is preferably adapted to chemically react with a substrate surface to be characterized.

Another embodiment provides a method of performing atomic force microscopy, wherein the method comprises attaching a carbon nanotube to an atomic force microscope probe to form a probe tip, wherein the carbon nanotube is configured into a Y shape; chemically modifying the carbon nanotube probe tip with any of an amine, carboxyl, fluorine, and metallic component; and analyzing a surface of a substrate using the chemically modified Y-shaped carbon nanotube probe tip. The method may further comprise configuring the carbon nanotube probe tip with a shaft portion and a pair of angled arms extending from a same end of the shaft portion. Additionally, the method may further comprise configuring each of the pair of angled arms at a length of at least 200 nm. Moreover, the method may further comprise configuring each of the pair of angled arms at a diameter between 10 and 200 nm. Preferably, the chemically modified Y-shaped carbon nanotube is adapted to allow differentiation between substrate materials to be probed. Also, the chemically modified Y-shaped carbon nanotube is preferably adapted to allow fluorine gas to flow through the chemically modified carbon nanotube onto a substrate to be characterized. Furthermore, the chemically modified Y-shaped carbon nanotube is preferably adapted to chemically react with a substrate surface to be characterized.

These and other aspects of the embodiments herein will be better appreciated and understood when considered in conjunction with the following description and the accompanying drawings. It should be understood, however, that the following description, while indicating preferred embodiments and numerous specific details thereof, is given by way of illustration and not of limitation. Many changes and modifications may be made within the scope of the embodiments herein without departing from the spirit thereof, and the embodiments include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
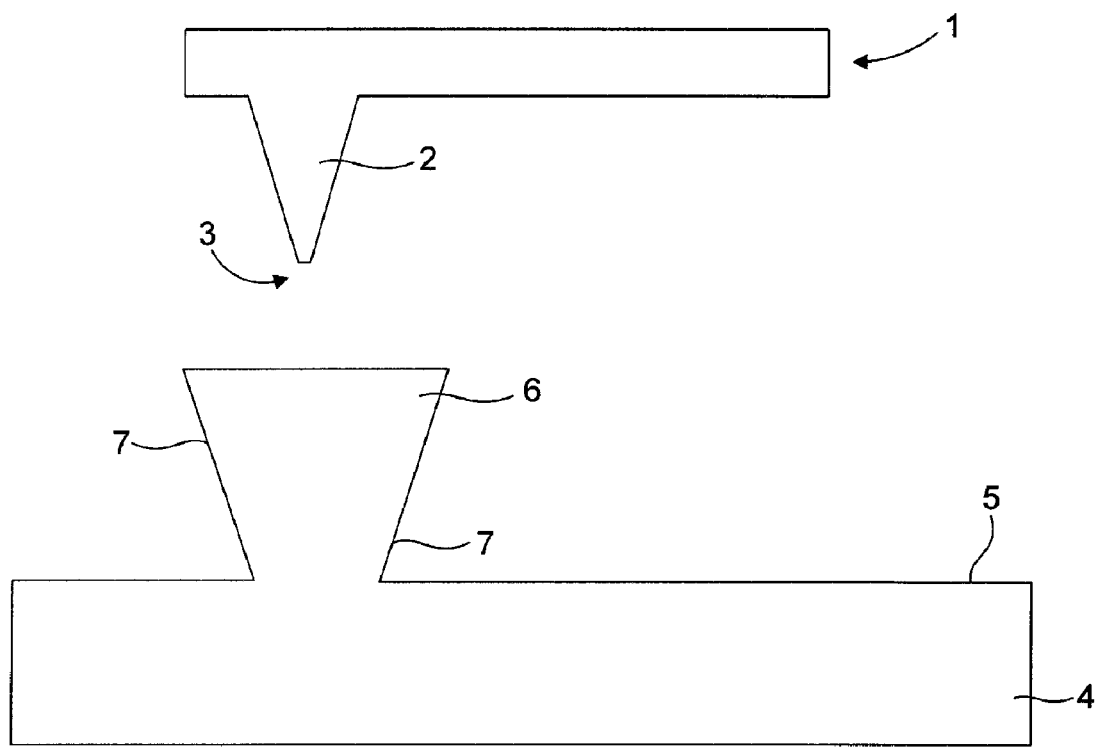
FIG. 1 illustrates a schematic diagram of a conventional AFM probe apparatus.

The embodiments herein and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need to develop additional methods of manufacturing AFM probe tips more reproducibly, and from other materials than silicon, which can be more durable and have a smaller dimension than conventional AFM probe tips, and which can be used to analyze substrates with an angled topography. The embodiments herein achieve this by providing an AFM probe tip formed of Y-shaped carbon nanotubes (CNT), which can be used for analyzing substrates with an angled topography. Referring now to the drawings, and more particularly to FIGS. 2(A) through 9(B), where similar reference characters denote corresponding features consistently throughout the figures, there are shown preferred embodiments herein.

The embodiments herein provide a CNT structure that is more durable than conventional silicon tips used on AFM probes because the arms 13 of the CNT AFM probe tip 15 provided by the embodiments herein are mechanically flexible and are mechanically stronger than silicon. The embodiments herein utilize Y-shaped carbon nanotubes as the active probe tip 15 of an AFM probe 10 to allow for lateral reach for undercut profiles of an underlying substrate 22 to be analyzed.

Figure 2A:
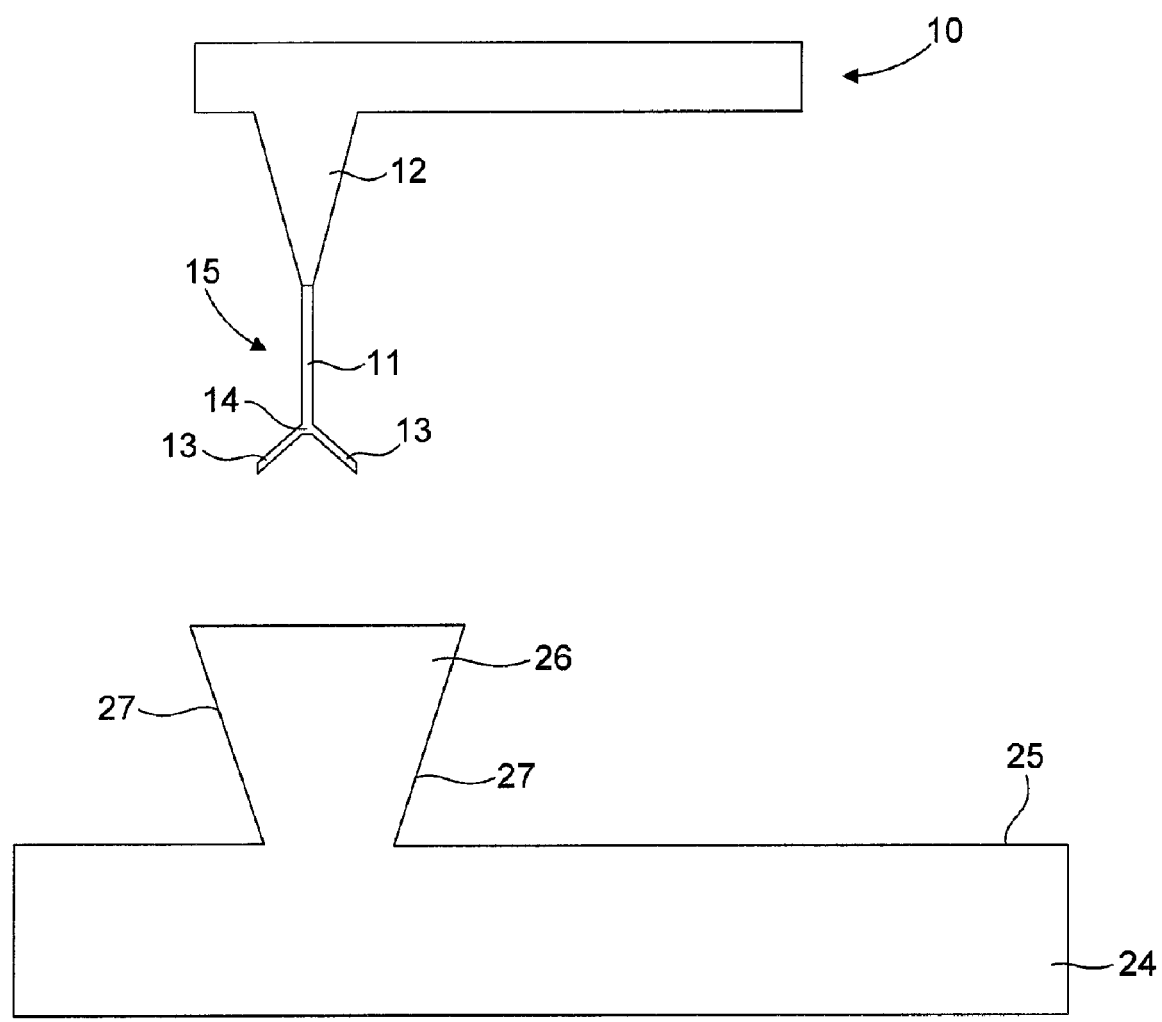
FIG. 2(A) illustrates a schematic diagram of a Y-shaped carbon nanotube AFM probe apparatus according to a first embodiment herein.
Figure 2B:
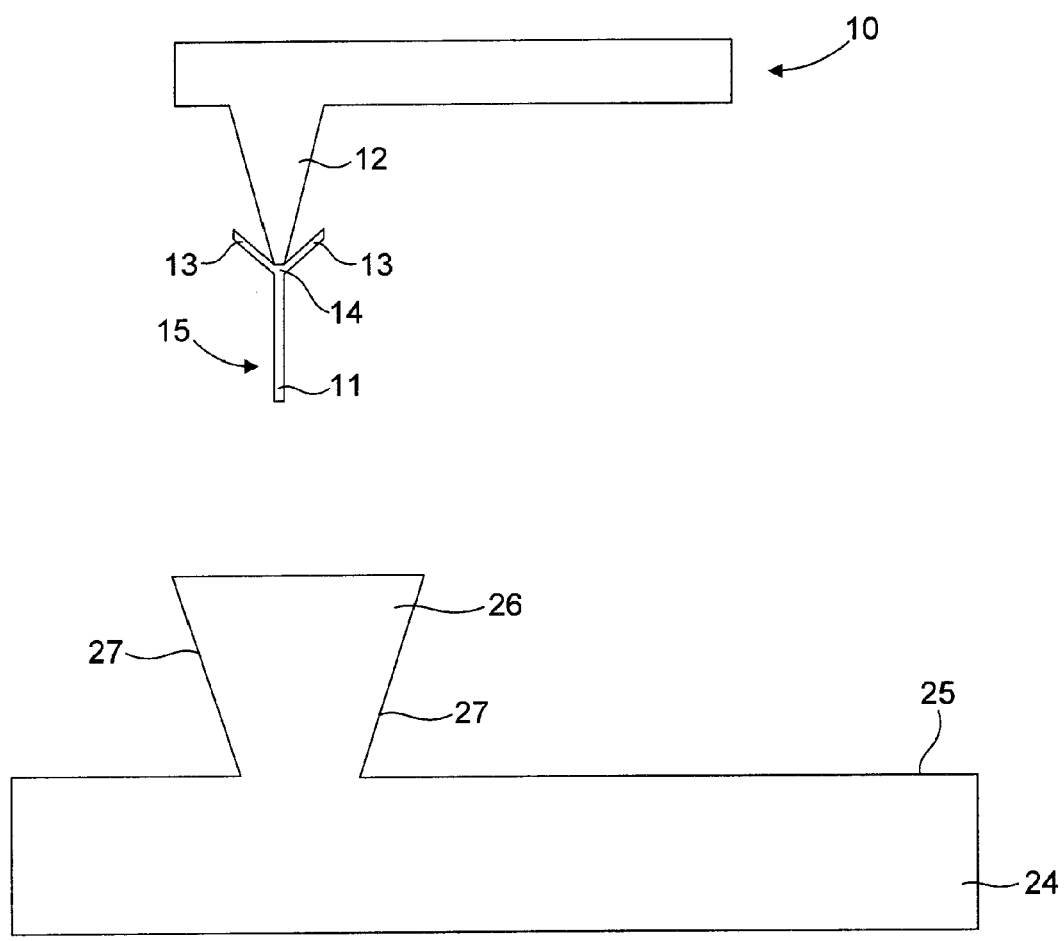
FIG. 2(B) illustrates a schematic diagram of a Y-shaped carbon nanotube AFM probe apparatus according to a second embodiment herein.

FIG. 2(A) illustrates a Y-shaped CNT AFM probe 10 in accordance with a first embodiment herein. The probe 10 comprises a probe arm 12 having a Y-shaped CNT tip 15 extending therefrom. The Y-shaped CNT tip 15, which is formed of carbon nanotubes, includes a generally straight shaft portion 11 and a pair of angled arms 13 extending from a confluence point 14 and joined to the shaft portion 11. FIG. 2(B) illustrates a probe 10 according to a second embodiment herein, which flips the Y-shaped CNT tip 15 such that the angled arms 13 are pointing towards the probe arm 12, whereby the probe arm 12 connects to the arms 13 or the confluence point 14 and the straight shaft portion 11 is pointing downward toward a substrate 24 to be analyzed.

Figure 3:
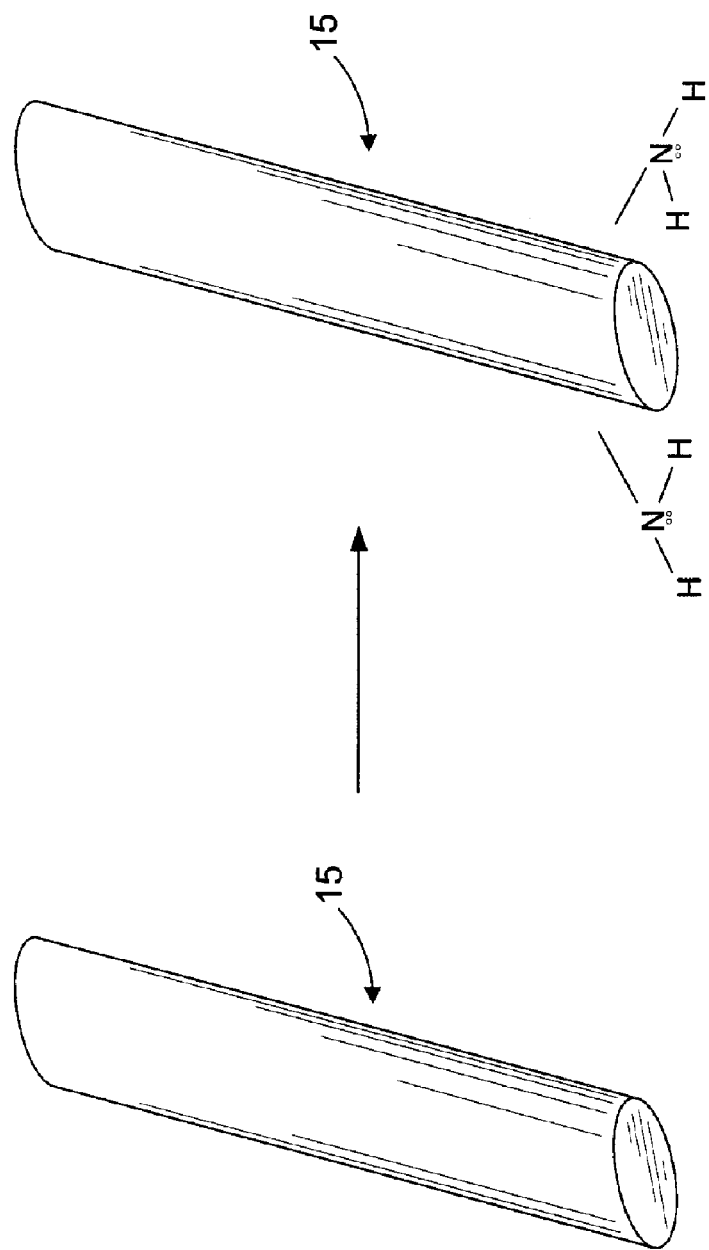
FIG. 3 illustrates a schematic diagram of the Y-shaped carbon nanotube AFM probe tip of FIGS. 2(A) and 2(B) undergoing a chemical modification in the presence of methane gas according to an embodiment herein.

According to the embodiments herein, the Y-shaped carbon nanotubes can be grown by impregnating a magnesium oxide (MgO) support material with cobalt from solution. The supported catalyst is exposed to methane gas at an elevated temperature of approximately 800 to 1,000° C. to create the Y-shaped CNT as shown in FIG. 3. More specifically, as described in Li, W. Z. et al., "Straight carbon nanotube Y-junctions," Appl. Phys. Lett. 79, 1879-1881 (2001), the complete disclosure of which, in its entirety, is herein incorporated by reference, the MgO supported Co catalysts may be prepared by dissolving 0.246 g of cobalt nitrate hexahydrate (Co(NO3)2-6H2O, 98%) in 40 mL ethyl alcohol first, and then immersing 2 grams of MgO powder (−325 mesh, 99%) in the solution by sonicating for approximately 50 minutes. After drying, the material is calcined at approximately 130° C. for approximately 14 hours. For carbon nanotube growth, the catalysts are first reduced at approximately 1000° C. for approximately 1 hour in flowing gases of H$_2$ (40 sccm) with N$_2$ (100 sccm) at a pressure of approximately 200 torr, then the N$_2$ is replaced with CH$_4$ (10 sccm) to start carbon nanotube growth. The growth normally lasts for approximately 1 hour. The arms 13 of the CNT tip 15 can be varied in length from approximately a few hundred (i.e., 200) nanometers to one micron or more. The diameter of the CNT can be varied from approximately 10 to 200 nm, depending on the specific gas pressure and temperature.

The CNT tip 15 can be mounted on the AFM probe arm 12 in accordance with the process described in U.S. Pat. No. 6,800,865, the complete disclosure of which, in its entirety, is herein incorporated by reference, wherein an electric field is used to draw the CNT tip 15 to the probe arm 12, and then the CNT tip 15 is glued on the probe arm 12 by use of an E-beam curing process. Alternatively, the mounting can occur in accordance with the technique described in U.S. Pat. No. 6,755,956, the complete disclosure of which, in its entirety, is herein incorporated by reference, which provides that the growth of CNTs may occur directly onto the probe tip 15, so that the CNT tip 15 is attached to the probe arm 12 after growth. Also, the mounting may occur as described in U.S. Patent Application No. 2004/0009308, which describes forming a catalyst on the probe tip 15, using a focused ion beam (FIB) to shape the catalyst, and growing a Y shaped CNT on the probe tip 15 as an AFM probe. Thus, the CNT tip 15 can be mounted on the AFM probe arm 12 such that the arms 13 of the CNT tip 15 extend down toward the surface 25 of the substrate 24 to be characterized as illustrated in FIG. 2(A), allowing the arms 13 to extend underneath an over-hanging profile feature 26, and allowing the slope 27 of the profile to be measured. If desired, the CNT tip 15 can also be mounted on the probe arm 12 such that two of the arms 13 of the CNT Y-shaped tip 15 are bound to the probe arm 12, with a single CNT arm 11 extending toward the surface 25 of the substrate 24 to be characterized.

The surfaces of the CNT Y-shaped tip 15 can also be modified with amine, carboxyl, fluorine, or metallic components, which can allow differentiation between substrate materials as illustrated in FIGS. 4 through 7. For example, copper typically binds strongly to amines; accordingly an amine-modified CNT can interact more strongly with a copper portion of the substrate than merely with a silicon or silicon oxide portion of the substrate.

Figure 4:
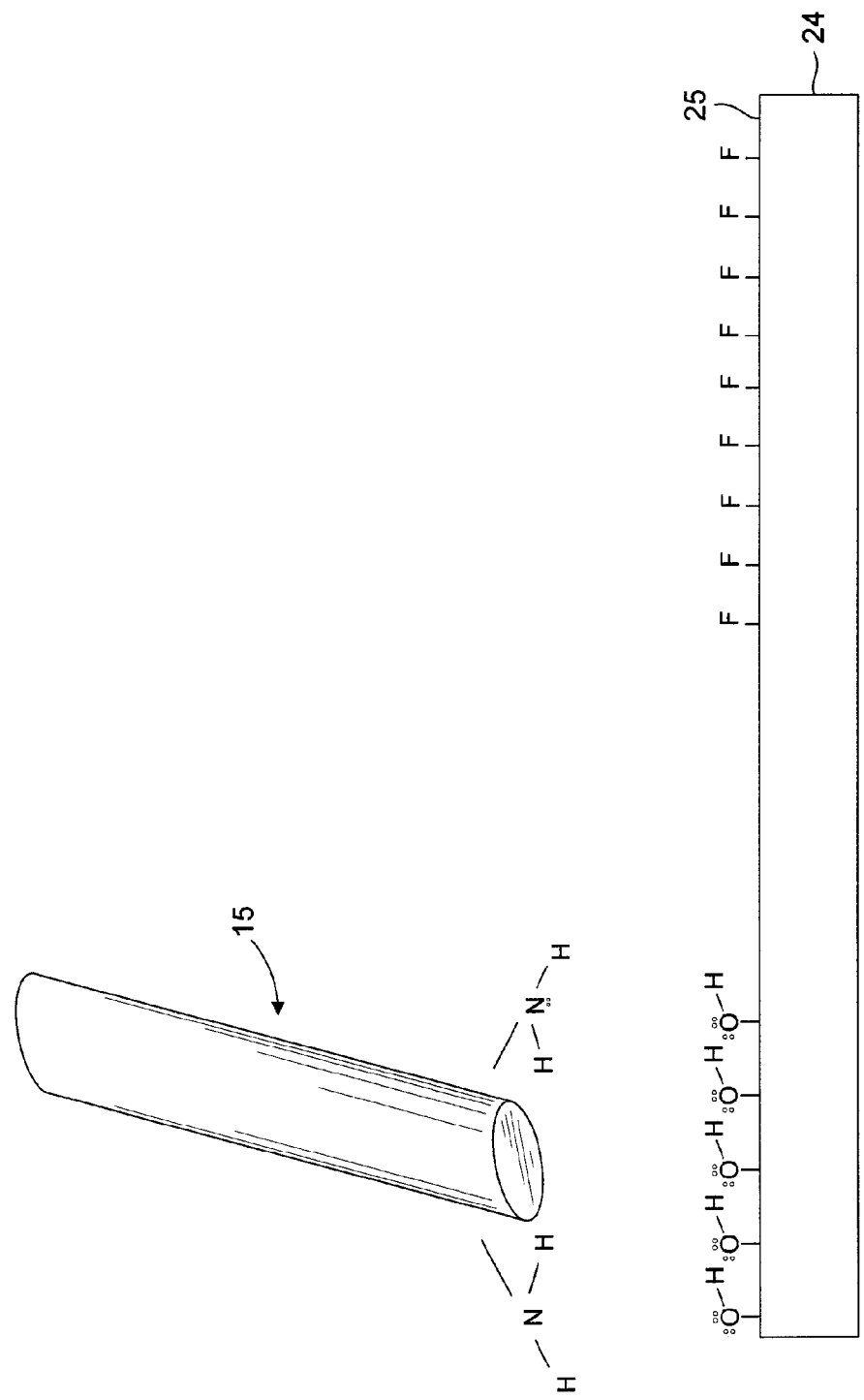
FIG. 4 illustrates a schematic diagram of the Y-shaped carbon nanotube AFM probe tip of FIG. 3 undergoing a chemical modification with an amine component and a fluorine component according to an embodiment herein.

FIG. 4 illustrates a schematic diagram of the Y-shaped carbon nanotube AFM probe tip of FIG. 3 undergoing a chemical modification with an amine component and a fluorine component. The fluorination of a carbon nanotube is describe in Dai, L. et al., "Functionalized surfaces based on polymers and carbon nanotubes for some biomedical and optoelectronic applications," Nanotechnology 14 No. 10, 1081-1097, October 2003, and U.S. Pat. Nos. 6,645,455 and 6,841,139, the complete disclosures of which, in their entireties, are herein incorporated by reference, and involves exposing the CNT tip 15 to gaseous fluorine at temperatures of approximately 250-350° C. The fluorinated CNT tip 15 can then be further modified with other reagents to introduce a variety of other functionalities, such as amino, hydroxyl, alkyl, thiol. Moreover, films can be deposited on the CNT tip 15 from an upstream plasma source, using source gases such as ammonia, ethylene diamine, acetic acid, ethyl acetate, methanol, methylamine, acetaldehyde, etc. The upstream plasma generates reactive species which deposit on the CNT tip 15 to create a functionalized surface.

Figure 5:
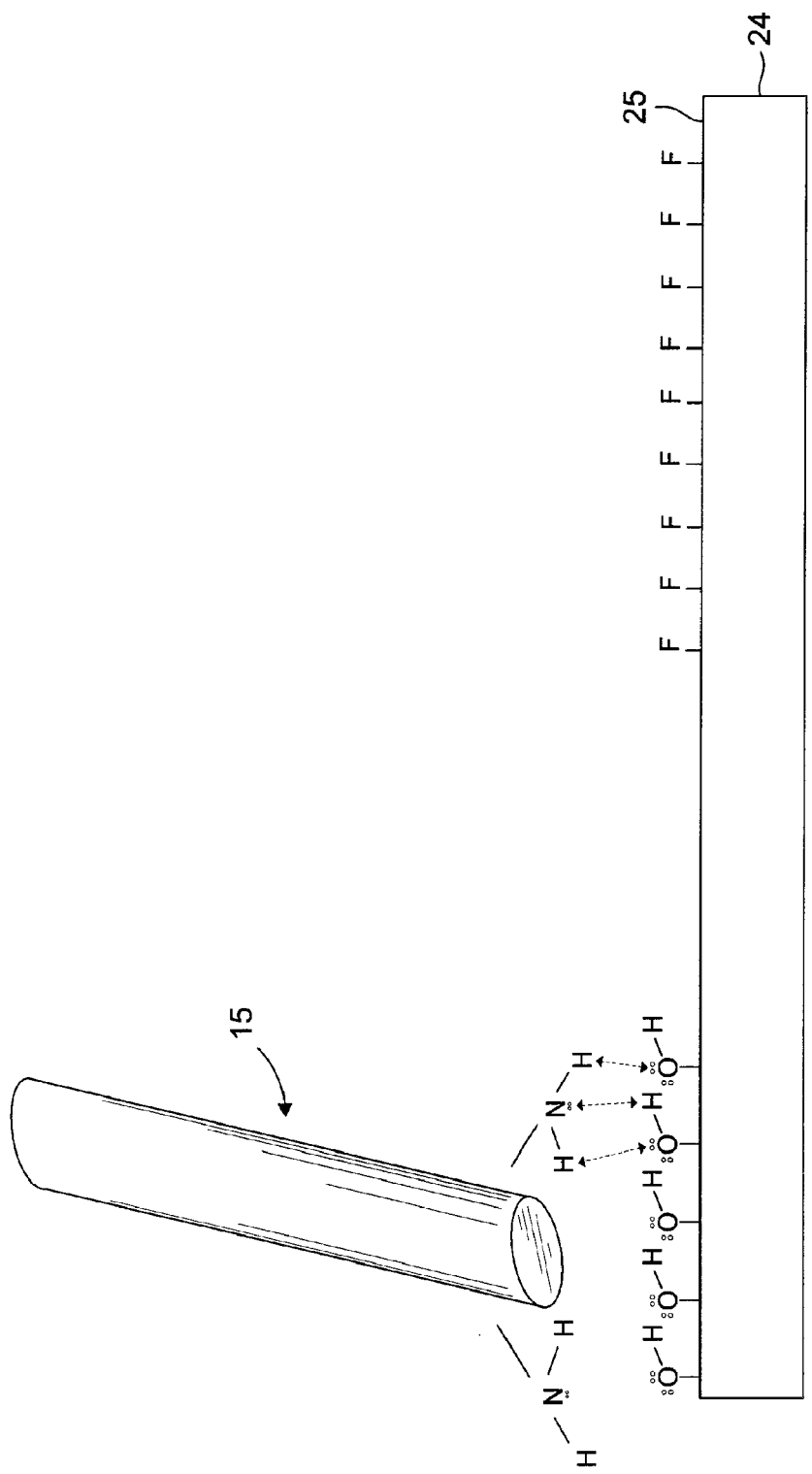
FIG. 5 illustrates a schematic diagram of the chemical interaction between the Y-shaped carbon nanotube AFM probe tip and the amine component of FIG. 4 according to an embodiment herein.

FIG. 5 illustrates a schematic diagram of the chemical interaction between the Y-shaped carbon nanotube AFM probe tip and the amine component of FIG. 4. Specifically, in FIG. 5, the CNT tip 15 has been modified with amine functionality. The amine includes polarized N—H bonds, which are suitable for creating hydrogen-bonding interactions with other polar chemical species, such as hydroxyl. In this case, as the CNT probe tip 15 is scanned across the surface 25 of the substrate 24, the hydrogen bonding between the amine functionality and the hydroxyl groups on the substrate surface 25 will cause a force to be applied to the CNT tip 15 and to the probe arm 12 (not shown in FIG. 5). A deflection in the probe arm 12 will result, giving a signal to the AFM tool (not shown) that a strong surface interaction is occurring. On the other hand, a fluorinated surface generally does not create an opportunity for such hydrogen bonding between the amine functionalized probe tip 12 and the fluorinated surface 25, so the CNT tip 15 will not interact strongly with the fluorinated surface 25 and the AFM tool (not shown) will not register a signal to the same extent.

Figure 6:
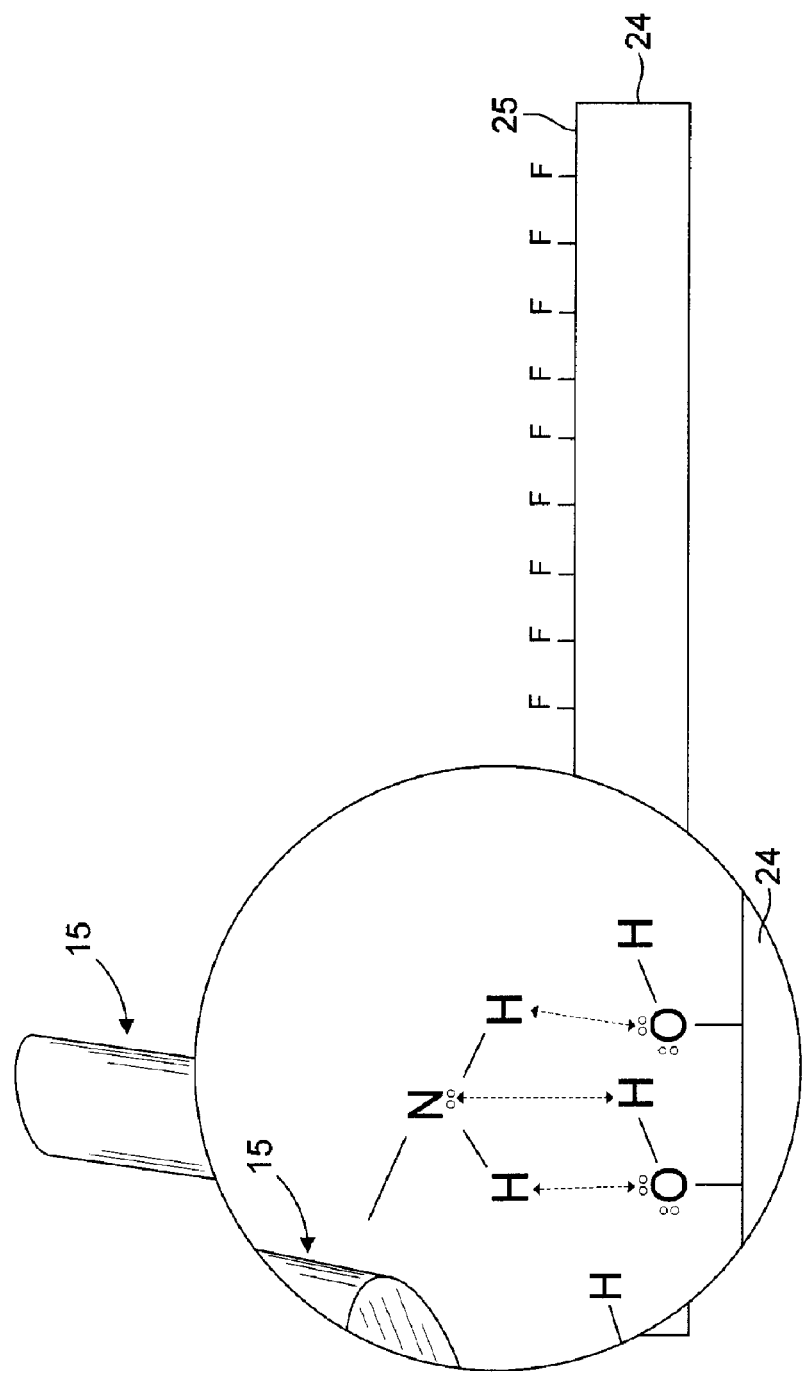
FIG. 6 illustrates an enlarged view of the chemical interaction illustrated in FIG. 5 according to an embodiment herein.

FIG. 6 illustrates an enlarged view of the chemical interaction illustrated in FIG. 5. More particularly, FIG. 6 shows the hydrogen bonding interaction between the aminated CNT tip 15 and the hydroxylated substrate surface 24 in more detail. Specifically, FIG. 6 depicts that the non-bonding electron pair which exists on nitrogen, and the two non-bonding pairs of electrons which exist on oxygen. The high electronegativity of nitrogen and oxygen cause them to draw electron density towards the nitrogen and oxygen atoms, while the bonded hydrogen atoms are consequently left with a lower level of electron density. As a result, the hydrogen atoms of these species tend to form an attraction, or a weak bond, to adjacent electron-rich areas, such as the non-bonding electron pairs on nitrogen or oxygen. While these hydrogen bonding interactions are generally weak relative to typical covalent bonds, in aggregate they can serve to create significant intermolecular interactions in the liquid or solid state.

Figure 7:
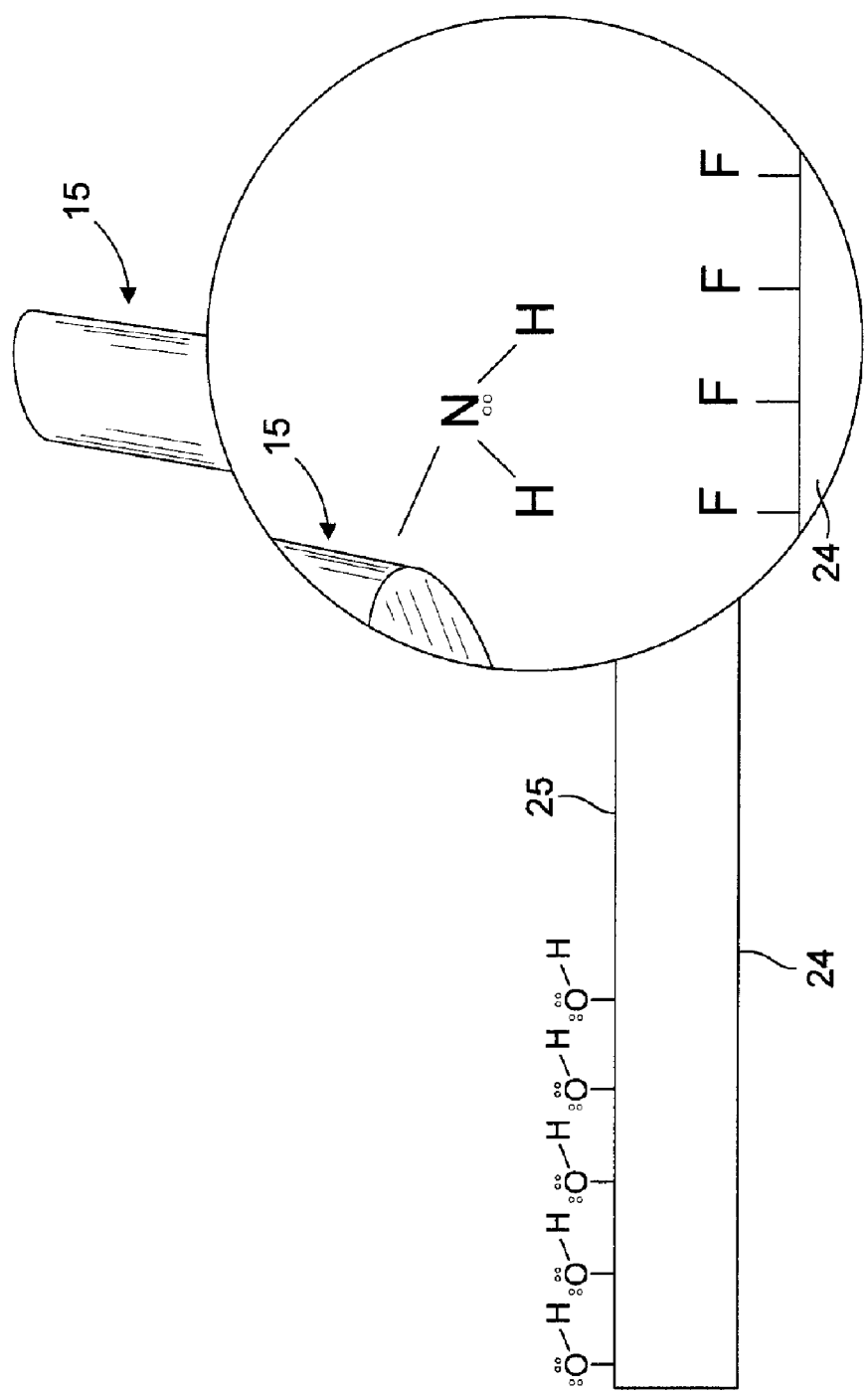
FIG. 7 illustrates an enlarged view of the chemical interaction between the Y-shaped carbon nanotube AFM probe tip and the fluorine component of FIG. 4 according to an embodiment herein.

FIG. 7 illustrates an enlarged view of the chemical interaction between the Y-shaped carbon nanotube AFM probe tip and the fluorine component of FIG. 4. More particularly, FIG. 7 shows an absence of hydrogen bonding interaction between the fluorinated substrate surface 25 and the aminated CNT tip 15. There are three pairs of non-bonding electrons distributed around the fluorine atom, which are not shown in FIG. 7. The fluorine atom is more electronegative than either nitrogen or oxygen, and is less favored energetically to share these electrons with a proximal hydrogen atom, so the hydrogen bonding between and amine and a fluorinated substrate is relatively weak. Also, the fluorinated surface does not contain any hydrogen groups which might likewise form a hydrogen bond with the nitrogen of the amine functionality. As a result, a relatively weak interaction occurs between the fluorinated surface 25 of the substrate 24 and the aminated CNT tip 15.

Figure 8:
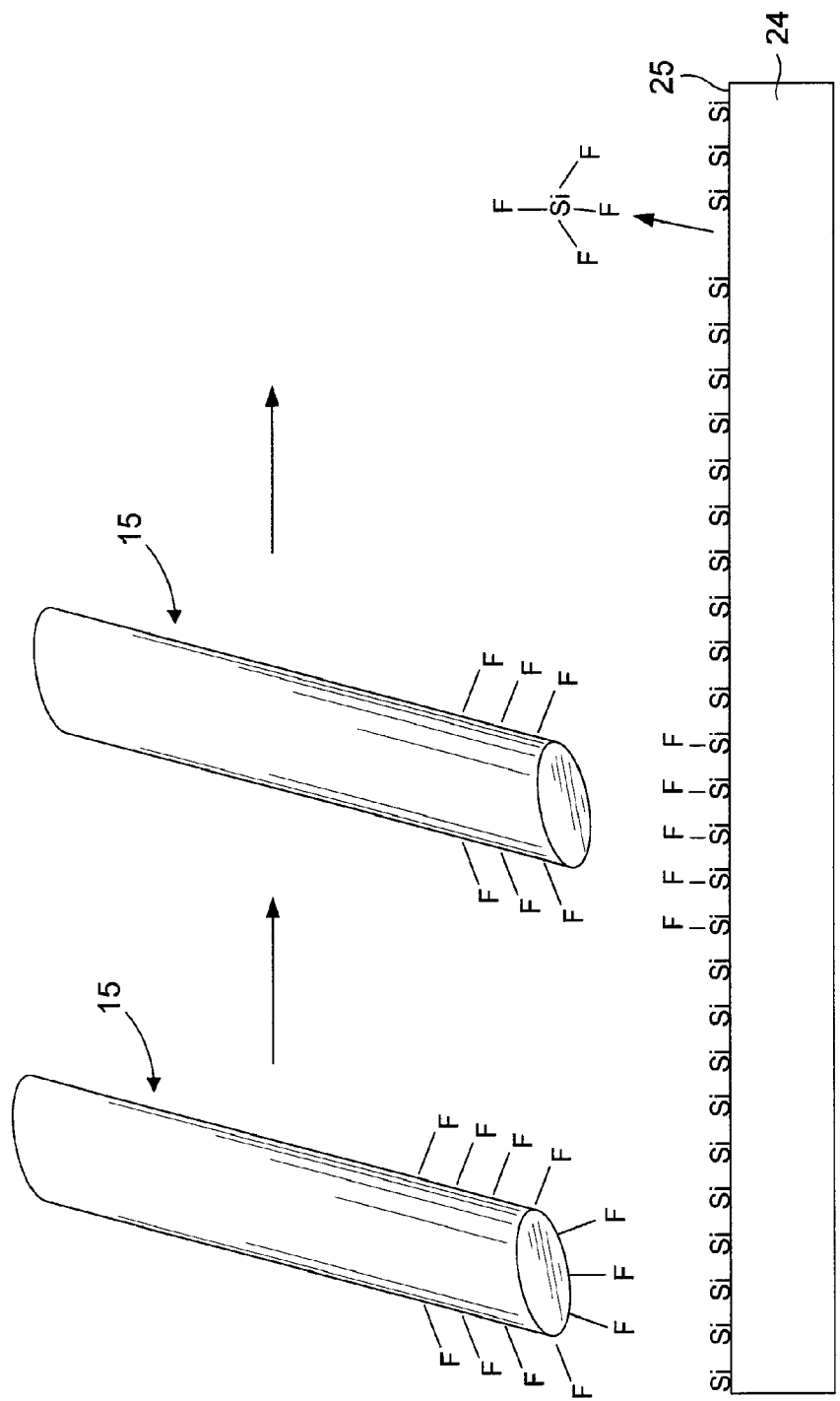
FIG. 8 illustrates a schematic diagram of a nano-etching process according to an embodiment herein.

FIG. 8 illustrates a schematic diagram of a nano-etching process, whereby a flow of fluorine gas is pushed through the CNT probe tip 15 and onto a substrate 24, which allows for selective etching/modification of the surface 25 of the substrate 24. More particularly, FIG. 8 shows the fluorination of a silicon substrate by a fluorinated CNT. This type of chemistry is driven by a relatively weak and thermally reversible CNT bond to fluorine, while, in contrast, the silicon-fluorine bond is typically the strongest single bond. Furthermore, the silicon surface can be etched by the fluorinated CNT due to the volatility of $SiF_4$, which readily allows the reacted silicon to be removed from the substrate surface 25. The fluorine on the CNT tip 15 can be re-generated by exposing the CNT tip 15 to fluorine gas in a separate chamber from the substrate 24. Or, alternatively, the CNT tip 15 can be attached to a manifold (not shown) on the cantilever arm, covered with a porous ceramic material, which allows fluorine gas to flow down through the nanotube to the substrate 24 below.

Figure 9A:
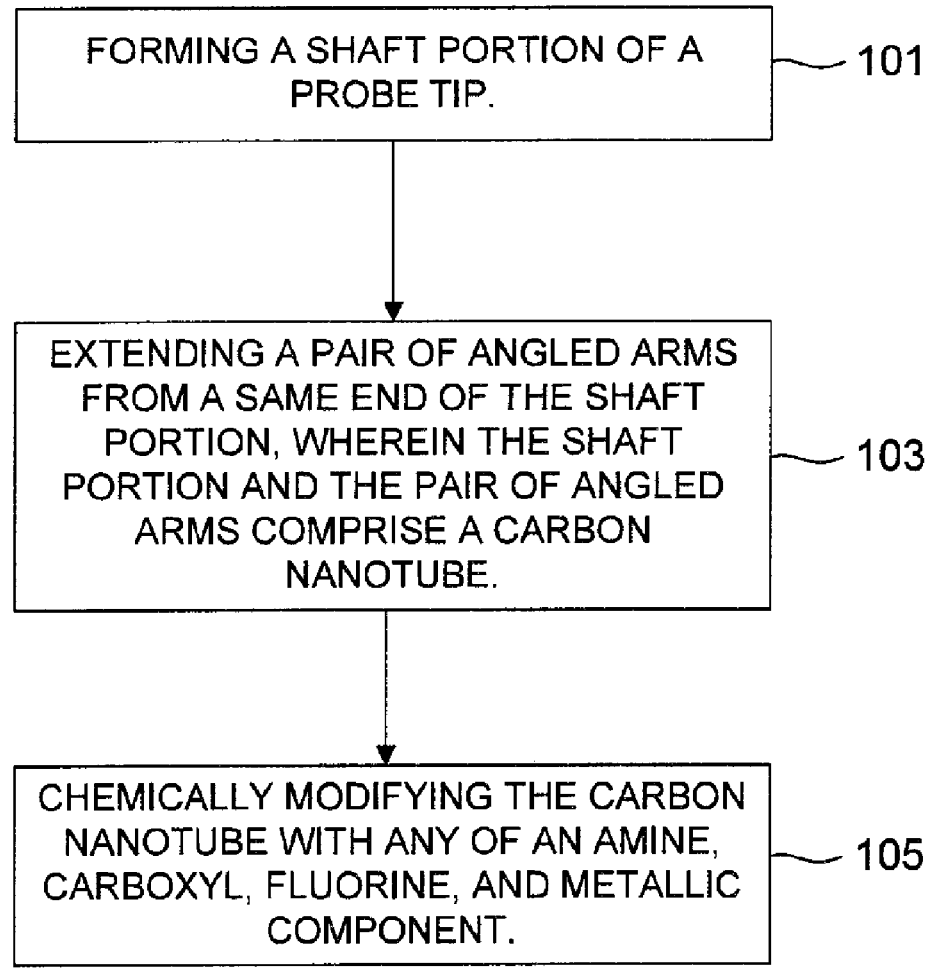
FIGS. 9(A) and 9(B) are flow diagrams illustrating preferred methods according to the embodiments herein.

FIG. 9(A) (with reference to FIGS. 2(A) through 8) is a flowchart illustrating a method of forming a Y-shaped carbon nanotube atomic force microscope probe tip 15 in accordance with an embodiment herein, wherein the method comprises forming (101) a shaft portion 11 of the probe tip 15; extending (103) a pair of angled arms 13 from a same end of the shaft portion 11, wherein the shaft portion 11 and the pair of angled arms 13 comprise a carbon nanotube (not shown); and chemically modifying (105) the carbon nanotube with any of an amine, carboxyl, fluorine, and metallic component. The method may further comprise configuring each of the pair of angled arms 13 at a length of at least 200 nm; and configuring each of the pair of angled arms 13 at a diameter between 10 and 200 nm. Moreover, the chemically modified carbon nanotube is preferably adapted to allow differentiation between substrate materials to be probed. Furthermore, the chemically modified carbon nanotube is preferably adapted to allow fluorine gas to flow through the chemically modified carbon nanotube onto a substrate 24 to be characterized. Additionally, the chemically modified carbon nanotube is preferably adapted to chemically react with a substrate surface 24 to be characterized.

Figure 9B:
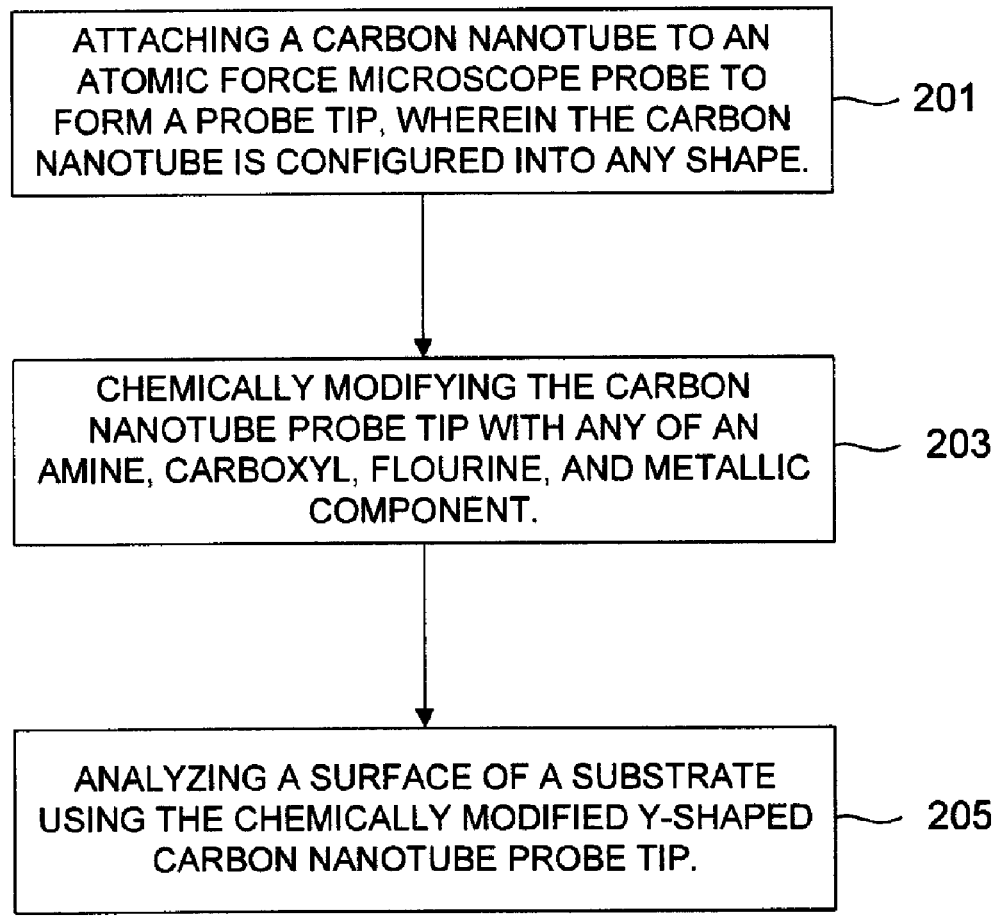

FIG. 9(B) (with reference to FIGS. 2(A) through 8) is a flowchart illustrating a method of performing atomic force microscopy in accordance with an embodiment herein, wherein the method comprises attaching (201) a carbon nanotube (not shown) to an atomic force microscope probe 10 to form a probe tip 15, wherein the carbon nanotube is configured into a Y shape; chemically modifying (203) the carbon nanotube probe tip 15 with any of an amine, carboxyl, fluorine, and metallic component; and analyzing (205) a surface 25 of a substrate 24 using the chemically modified Y-shaped carbon nanotube probe tip 15. The method may further comprise configuring the carbon nanotube probe tip 15 with a shaft portion 11 and a pair of angled arms 13 extending from a same end of the shaft portion 11. Additionally, the method may further comprise configuring each of the pair of angled arms 13 at a length of at least 200 nm. Moreover, the method may further comprise configuring each of the pair of angled arms 13 at a diameter between 10 and 200 nm. Preferably, the chemically modified Y-shaped carbon nanotube is adapted to allow differentiation between substrate materials to be probed. Also, the chemically modified Y-shaped carbon nanotube is preferably adapted to allow fluorine gas to flow through the chemically modified carbon nanotube onto a substrate 24 to be characterized. Furthermore, the chemically modified Y-shaped carbon nanotube is preferably adapted to chemically react with a substrate surface 25 to be characterized.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments can be practiced with modification within the spirit and scope of the appended claims.

What is claimed is:

1. A Y-shaped carbon nanotube atomic force microscope probe tip comprising:
    a shaft portion;
    a pair of angled arms extending from a same end of said shaft portion,
    wherein said shaft portion and said pair of angled arms comprise a chemically modified carbon nanotube, and
    wherein said chemically modified carbon nanotube is modified with any of an amine, carboxyl, fluorine, and metallic component.

2. The probe tip of claim 1, all the limitations of which are incorporated herein by reference, wherein each of said pair of angled arms comprise a length of at least 200 nm.

3. The probe tip of claim 1, all the limitations of which are incorporated herein by reference, wherein each of said pair of angled arms comprise a diameter between 10 and 200 nm.

4. The probe tip of claim 1, all the limitations of which are incorporated herein by reference, wherein said chemically modified carbon nanotube is adapted to allow differentiation between substrate materials to be probed.

5. The probe tip of claim 1, all the limitations of which are incorporated herein by reference, wherein said chemically modified carbon nanotube is adapted to allow fluorine gas to flow through said chemically modified carbon nanotube onto a substrate to be characterized.

6. The probe tip of claim 1, all the limitations of which are incorporated herein by reference, wherein said chemically modified carbon nanotube is adapted to chemically react with a substrate surface to be characterized.

7. A method of forming a Y-shaped carbon nanotube atomic force microscope probe tip, said method comprising:
    forming a shaft portion of said probe tip;
    extending a pair of angled arms from a same end of said shaft portion, wherein said shaft portion and said pair of angled arms comprise a carbon nanotube; and
    chemically modifying said carbon nanotube with any of an amine, carboxyl, fluorine, and metallic component.

8. The method of claim 7, all the limitations of which are incorporated herein by reference, further comprising configuring each of said pair of angled arms at a length of at least 200 nm.

9. The method of claim 7, all the limitations of which are incorporated herein by reference, further comprising configuring each of said pair of angled arms at a diameter between 10 and 200 nm.

10. The method of claim 7, all the limitations of which are incorporated herein by reference, wherein said chemically modified carbon nanotube is adapted to allow differentiation between substrate materials to be probed.

11. The method of claim 7, all the limitations of which are incorporated herein by reference, wherein said chemically modified carbon nanotube is adapted to allow fluorine gas to flow through said chemically modified carbon nanotube onto a substrate to be characterized.

12. The method of claim 7, all the limitations of which are incorporated herein by reference, wherein said chemically modified carbon nanotube is adapted to chemically react with a substrate surface to be characterized.

13. A method of performing atomic force microscopy, said method comprising:
    attaching a carbon nanotube to an atomic force microscope probe to form a probe tip, wherein said carbon nanotube is configured into a Y shape;
    chemically modifying the carbon nanotube probe tip with any of an amine, carboxyl, fluorine, and metallic component; and
    analyzing a surface of a substrate using the chemically modified Y-shaped carbon nanotube probe tip.

14. The method of claim 13, all the limitations of which are incorporated herein by reference, further comprising configuring said carbon nanotube probe tip with a shaft portion and a pair of angled arms extending from a same end of said shaft portion.

15. The method of claim 14, all the limitations of which are incorporated herein by reference, further comprising configuring each of said pair of angled arms at a length of at least 200 nm.

16. The method of claim 14, all the limitations of which are incorporated herein by reference, further comprising configuring each of said pair of angled arms at a diameter between 10 and 200 nm.

17. The method of claim 13, all the limitations of which are incorporated herein by reference, wherein said chemically modified Y-shaped carbon nanotube is adapted to allow differentiation between substrate materials to be probed.

18. The method of claim 13, all the limitations of which are incorporated herein by reference, wherein said chemically modified Y-shaped carbon nanotube is adapted to allow fluorine gas to flow through said chemically modified carbon nanotube onto a substrate to be characterized.

19. The method of claim 13, all the limitations of which are incorporated herein by reference, wherein said chemically modified Y-shaped carbon nanotube is adapted to chemically react with a substrate surface to be characterized.

20. The method of claim 14, wherein said chemically modified Y-shaped carbon nanotube is attached at a confluence point between said pair of angled arms extending to a probe arm of said atomic force microscope.

* * * * *